US006340819B1

(12) United States Patent
Durst et al.

(10) Patent No.: US 6,340,819 B1
(45) Date of Patent: Jan. 22, 2002

(54) READOUT STRUCTURE AND TECHNIQUE FOR ELECTRON CLOUD AVALANCHE DETECTORS

(75) Inventors: Roger D. Durst, Middleton; Sean N. Carney, Madison; Yacouba Diawara, Madison; Rudolph Shuvalov, Madison, all of WI (US)

(73) Assignee: Bruker AXS, Inc., Madison, WI (US)

( * ) Notice: Subject to any disclaimer, the term of this patent is extended or adjusted under 35 U.S.C. 154(b) by 0 days.

(21) Appl. No.: 09/370,769

(22) Filed: Aug. 9, 1999

(51) Int. Cl.[7] .................................................. G01J 5/28
(52) U.S. Cl. ....................................... 250/374; 250/397
(58) Field of Search .................................. 250/374, 397

(56) References Cited

U.S. PATENT DOCUMENTS 6,121,622 A * 9/2000 Beyne et al. ............... 250/374

OTHER PUBLICATIONS

A.F. Barbosa et al.; Two–dimensional X–ray detector based on microstrip and multiwire design; Nuclear Instruments and Methods in Physics Research A323 (1992); North–Holland; pp. 247–251.
Ademarlaudo Franca Barbosa; Use of a multilayer printed circuit board as the position sensing electrode in an MWPC; Nuclear Instruments and Methods in Physics Research A 371 (1996) pp. 368–374.
Peter G. Friedman et al.; Multilayer anode with crossed serpentine delay lines for high spatial resolution readout of microchannel plate detectors; Rev. Sci. Instrum. 67 (2), Feb. 1996; pp. 596–608.
Stanley E. Sobottka et al.; Delay Line Readout of Microchannel Plates; IEEE Transactions on Nuclear Science, vol. 35, No. 1, Feb. 1988; pp. 348–351.
R.A. Boie et al.; High Resolution X–Ray Gas Proportional Detectors with Delay Line Position Sensing for High Counting Rates; Nuclear Instruments and Methods 201 (1982) 93–115; North Holland Publishing Company.
Ottmar Jagutzki et al.; Fast position and time resolved read–out of micro–channelplates with the delay–line technique for single particle and photon detection; SPIE vol. 3438; pp. 322–333.

* cited by examiner

*Primary Examiner*—Constantine Hannaher
*Assistant Examiner*—Andrew Israel
(74) *Attorney, Agent, or Firm*—Kudirka & Jobse, LLP

(57) ABSTRACT

A detection apparatus for detecting an electron cloud includes a resistive anode layer with a detection plane upon which the electron cloud is incident. The resistive layer is capacitively coupled to a readout structure having a conductive grid parallel to the detection plane. Charge on the resistive layer induces a charge on the readout structure, and currents in the grid. The location of the induced charge on the readout structure corresponds to the location on the detection plane at which the electron cloud is incident. Typically, the detection apparatus is part of a detector, such as a gas avalanche detector, in which the electron cloud is formed by conversion of a high-energy photon or particle to electrons that undergo avalanche multiplication. The spacing between the anode layer and the readout structure is selected so that the width of the charge distribution matches the pitch between conductive segments of the grid. The resistivity of the anode layer is selected to be low enough to support the highest bandwidth of the readout electronics, but high enough to allow penetration of the charge through the anode layer to the readout structure.

49 Claims, 3 Drawing Sheets

READOUT STRUCTURE AND TECHNIQUE FOR ELECTRON CLOUD AVALANCHE DETECTORS

FIELD OF THE INVENTION

The invention relates generally to the field of electromagnetic signal detection and, more particularly, to signal detection using photon-counting detectors.

BACKGROUND OF THE INVENTION

Photon-counting or particle-counting detectors are used extensively for science, industry and medicine. One example of such a detector is a gas avalanche detector. Recently, a number of new gas avalanche detectors based on parallel grid geometries have been developed. These new designs offer very high counting rate capability as compared to conventional Multiwire Proportional Counters (MWPC). They also offer higher gain, and superior stability and robustness as compared to Microstrip Gas Counters (MSGC). Indeed, this type of detector, when using a 100-micron gap, has demonstrated counting rates on the order of $10^9$ counts/mm$^2$-sec, nearly a million times faster than a conventional MWPC.

One type of parallel grid detector uses an arrangement as shown in FIG. 1, which is a schematic side view of a prior art photon counting detector 10. The detector is configured for use in detecting high energy particles or photons. For example, initial energy component 22 might be an x-ray used in an analysis technique such as x-ray diffraction. A cathode 12 of the detector is a conductive material that is transparent to the energy 22. In this particular detector, a photocathode layer 23 is located on the side of the cathode 12 away from the initial direction of the x-ray. As the x-ray energy passes through the cathode and encounters the photocathode material, it is converted from x-ray energy to a small number of electrons.

Located opposite cathode 12 is an anode 14. The anode is also conductive and is used for collecting electrons that originate at the cathode. One type of anode structure includes two orthogonal serpentine delay lines, as is discussed in more detail below. A voltage differential on the plates 12, 14 is provided by voltage sources 16, 17 and is typically in the range of 0.5–5 kV, the specific amount depending on the desired gain. Often, a conductive mesh 24 is placed between the cathode 12 and the anode 14. Typically, the mesh is a simple cross-hatch of conductive material, although other structures may also be used. The mesh is electrically returned to the voltage source 16, such that a circuit path is defined between the mesh 24 and the cathode 12. Thus, two different voltage differentials are defined by the structure, one across the space 18 between the cathode 12 and the mesh 24, and one across the gap between the mesh 24 and the anode 14. In this example, an electric potential is used in the region 18 that is lower than would be required to cause an avalanche multiplication of the electrons generated at the photocathode layer 23. In contrast, the region between the mesh 24 and the anode has a higher electric potential, which is sufficient to induce avalanche electron multiplication.

In the space 19 located between the anode 14 and the mesh 24 is an active gas material that, in the presence of the electric field generated by the voltage source 17, responds to the introduction of electrons that travel from the photocathode layer 23. With this electric field applied, the electrons from the cathode 12 will induce an avalanche secondary electron multiplication within the gas. An example of an electron multiplication within the detector 10 is given by the graphic depiction of the path 25 of an incident x-ray photon, and the ensuing electron multiplication. As shown, multiple secondary electrons are generated as the initial electron encounters the active gas. These secondary electrons themselves cause the generation of more secondary electrons, and the amplification process continues.

The use of a parallel grid detector allows detection of the electron cloud that results from the avalanche multiplication. For example, as is known in the art, two overlapping serpentine delay lines positioned orthogonal to each other provide a means by which the electron cloud may be located in a two-dimensional detection plane. The overlapping delay lines form a detection grid, the resolution of which is determined by the spacing between the lines, i.e., the "anode pitch." As demonstrated in FIG. 2, limits on the anode pitch directly limit the sensitivity of the detector.

FIG. 2 is a schematic view of one serpentine delay line 20 that provides spatial information in one of the two dimensions of the detection grid. It will be understood that the figure is not necessarily to scale, but is intended for instructional purposes only. For each of the parallel portions of the delay line upon which an electron cloud is incident, a signal is generated that is uniquely identifiable relative to that lateral position. Since a second delay line (not shown) has parallel paths that run perpendicular to the parallel paths of the first delay line, signals on these paths provide information relative to the position of the electron cloud in the perpendicular lateral direction of the detection plane. The signals from the two delay lines are detected using a detection circuit 15 (FIG. 1), and are used to determine the region of the detection plane that encounters the electron cloud.

In FIG. 2, regions impacted by two different electron clouds, labeled "A" and "B," are represented by circles overlapping the delay line 20. Each of these electron clouds generates detectable signals in the delay line. As shown, electron cloud A overlaps three of the parallel paths of the delay line, thereby generating three different signals at different time delays, and therefore at different determinable spatial positions in a first lateral dimension. However, electron cloud B overlaps only one of the delay line paths. With electron cloud A of FIG. 2, several signals in each of the two dimensions of the detection plane provide sufficient spatial information to calculate a centroid with a resolution more accurate than the anode pitch. However, spatial information provided by electron cloud B is limited by the fact that it overlaps only one delay line path. Thus, it is apparent that the resolution of a detector of this type for relatively small electron clouds will be limited to the anode pitch.

One way to increase the resolution of a delay line detector would be to narrow the pitch between the parallel paths. However, this necessarily increases the length of the delay lines as well which, in turn, significantly increases the signal attenuation. Alternatively, the gap 19 (FIG. 1) between the anode 14 and the mesh 24 can be increased to create a larger drift region within which the electron cloud can expand. However, electron reattachment can occur in this region, the extent of which depends on the gas molecules that are present. Thus, the demand on gas purity in region 19 would be greatly increased, which can be a significant concern for sealed-tube designs that are prone to outgassing over the long term. Moreover, the spacing of the region 19 determines not only the lateral diffusion of an electron cloud, but the longitudinal diffusion as well (i.e., diffusion in the direction perpendicular to the detection plane). More longitudinal diffusion degrades the time resolution of the detector, which can limit the counting rate and, for delay line readouts, degrades the spatial resolution.

SUMMARY OF THE INVENTION

In accordance with the present invention, a detection apparatus for detecting an electron cloud in two dimensions includes a resistive layer with a detection plane upon which the electron cloud is incident. The resistive layer is capacitively coupled to a readout apparatus such that interaction of the electron cloud with the resistive layer induces charge in the readout apparatus. The readout apparatus identifies the locations of the charge in a plane that is parallel to the detection plane, and thereby provides an indication of the two dimensional distribution of the electron cloud.

The detection apparatus is preferably part of a parallel grid detector, in which a high-energy photon or particle is amplified using electron avalanche multiplication. In a preferred embodiment, the photon or particle is converted to electrons, which are then accelerated toward an avalanche region. Within the avalanche region, an active secondary electron-emitting material is located and is encountered by the electrons. An acceleration field maintained in the avalanche region is high enough to induce the avalanche of secondary electrons that result in the electron cloud.

In a preferred embodiment, the readout apparatus has a conductive grid, which may consist of two orthogonal serpentine delay lines. Spacing between the resistive layer and the readout apparatus may be selected with regard to the grid. For example, for a given charge, the width of the charge distribution on the readout apparatus is matched to a pitch between conductive segments of the grid. Furthermore, in the preferred embodiment, the resistivity of the layer is used to control the rate of charge dissipation on the anode layer. In particular, the resistivity of the resistive layer is selected relative to the thickness of the anode and the bandwidth of the readout electronics used. The resistivity is selected to be low enough to support the highest bandwidth (i.e., counting rate) of the detector electronics, while still being high enough that the charge can penetrate through the anode layer to the readout plane.

DETAILED DESCRIPTION OF THE PREFERRED EMBODIMENT

Figure 1:
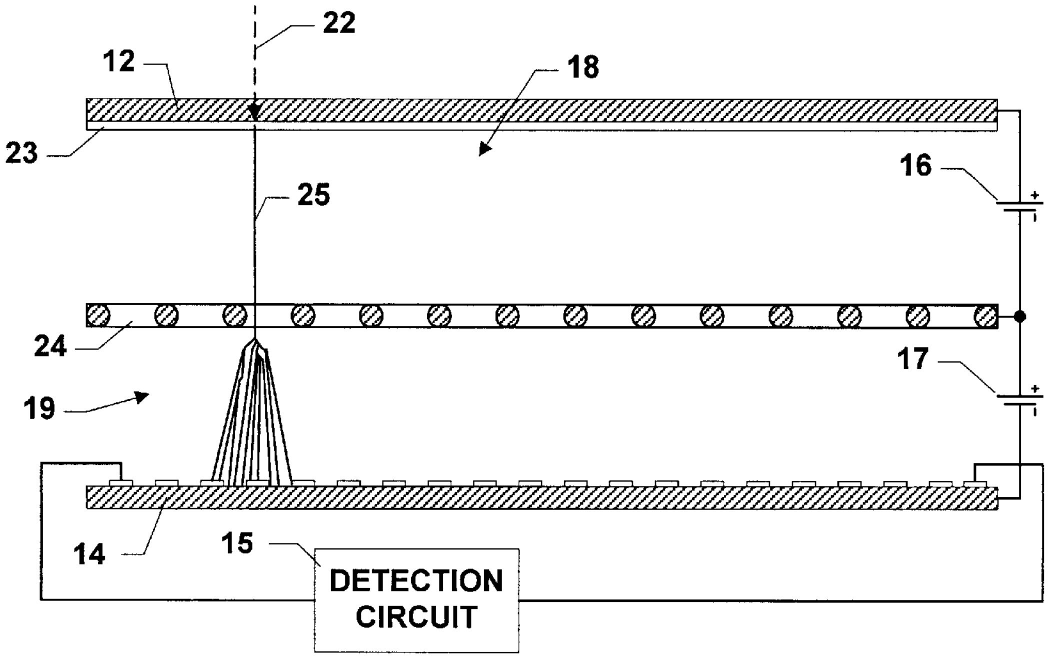
FIGURE 1 (PRIOR ART)
FIG. 1 is a schematic cross sectional side view of a prior art parallel grid detector.
Figure 3:
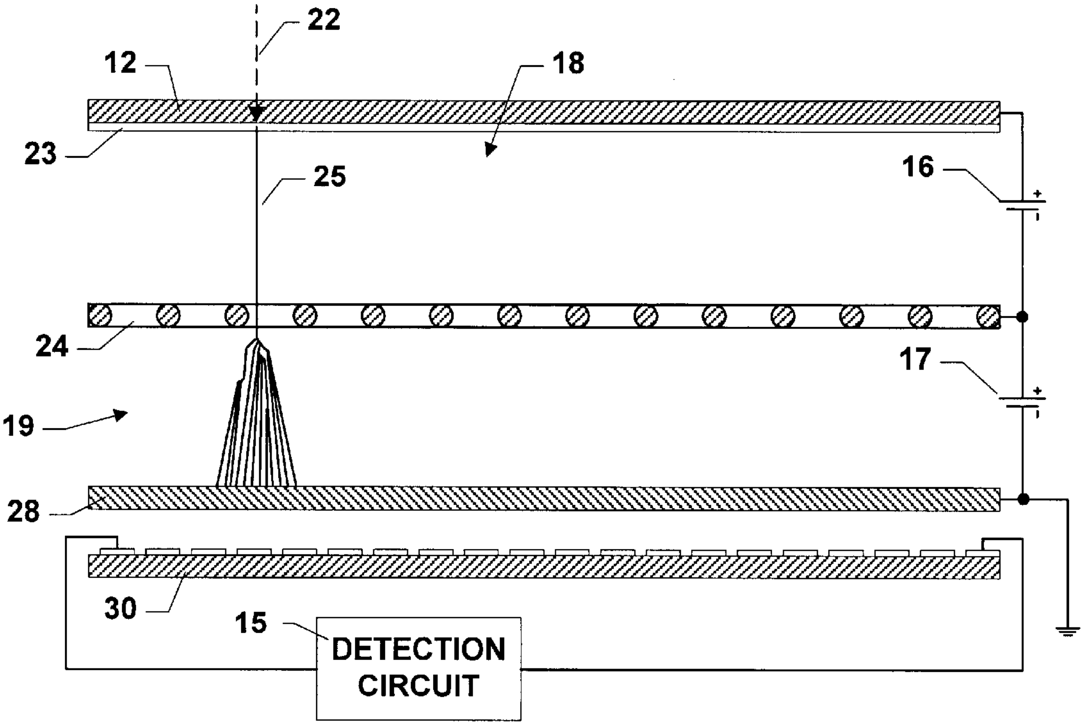
FIG. 3 is a schematic cross sectional side view of a parallel grid detector according to the present invention.
Figure 2:
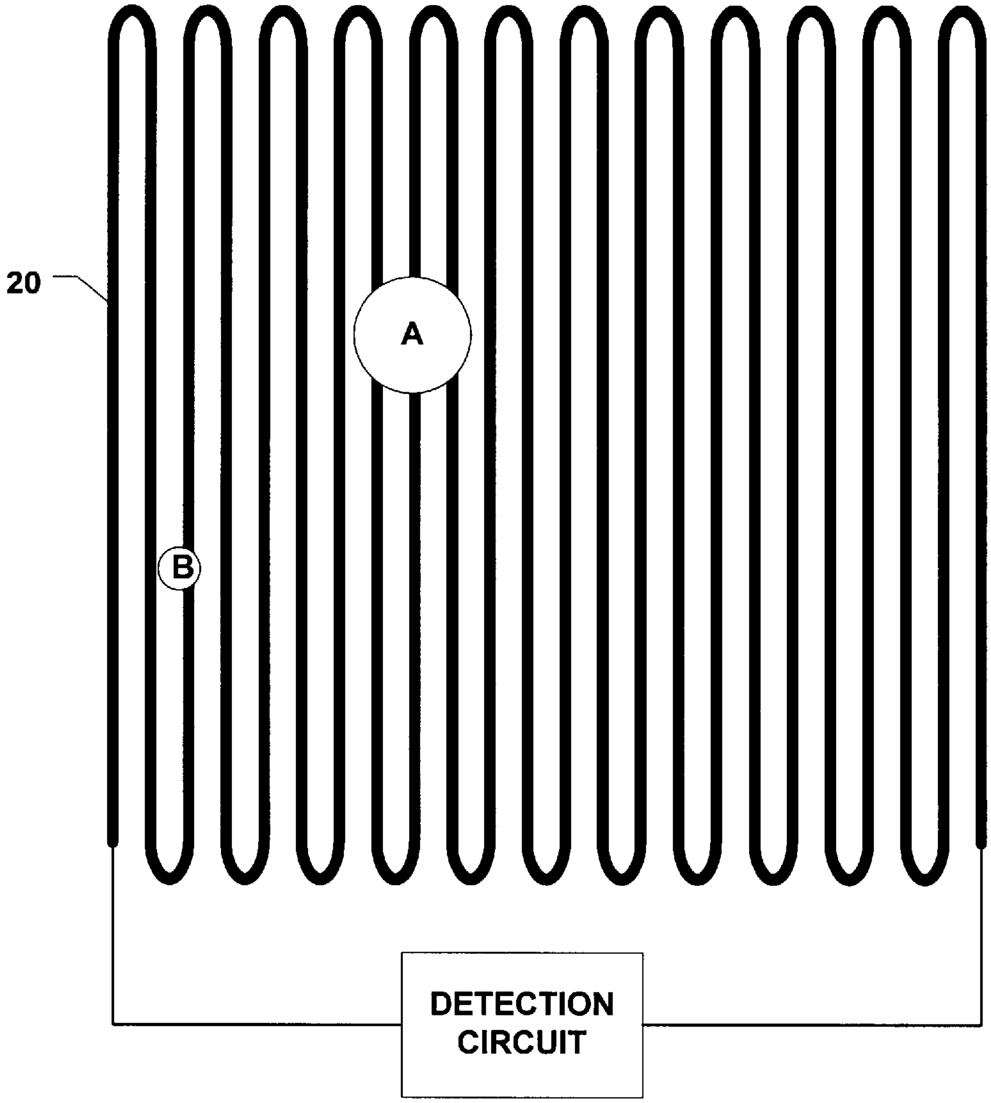
FIGURE 2 (PRIOR ART)
FIG. 2 is a schematic top view of a prior art serpentine delay line used with parallel grid detectors.

Shown in FIG. 3 is a detector according to a preferred embodiment of the invention. A number of the features of this detector are the similar to the prior art detector of FIG. 1, and the same reference numerals have been used for those elements that are the same in both figures. In this embodiment, as in FIG. 1, the electrons are generated in a photocathode layer 23 from the high-energy x-rays or particles 22 incident upon it. In a preferred embodiment, the layer is used for converting high energy x-rays and is a porous layer of cesium iodide, although other photocathode materials may be used as well. A drift region 18 is located between cathode 12 and mesh layer 24, and accelerates the electrons toward the mesh 24 via an electric potential provided by voltage source 16. This voltage source is not high enough to induce avalanche multiplication.

After passing through the mesh 24, electrons generated in the photocathode layer 23 enter the high field region between mesh 24 and resistive anode 28. The field strength in this layer is provided by voltage source 17, which produces a voltage potential than is higher than that produced by voltage source 16, and that provides region 19 with a field strength sufficient to induce electron avalanche multiplication in the presence of an active material. Those skilled in the art will recognize that the voltage sources 16, 17 are for descriptive purposes, and that the desired voltage potentials may be provided in any of a number of known ways.

In the preferred embodiment, the active material in the region 19 is a gas such as a quenched noble gas mixture, although other secondary electron-emitting materials may be used as well. The avalanche phenomenon within the gas results in the formation of an electron cloud that that is absorbed the anode 28. The anode 28 is a layer that has no defined conductive paths, but which is a reasonably homogeneous material of predetermined resistivity. As shown in FIG. 3, the anode is connected to ground at the edges, so the electrical energy absorbed from the electron cloud eventually dissipates. However, the anode material is resistive enough that there is a reasonably long time delay for the dissipation. That is, there is a temporary accumulation of electric charge in the local region of the anode 28 upon which the electron cloud is incident.

Positioned adjacent to the anode 28 to the side of it away from the incoming electron cloud is a readout structure 30. The readout structure is similar to the anode 14 of the prior art detector shown in FIG. 1 in that it has two orthogonal serpentine delay lines. As the electron cloud encounters the resistive anode 28, the deposited charge creates a capacitive coupling between the anode and the delay lines of the readout structure 30. This capacitive coupling with the delay lines has a similar effect as the direct coupling between the electron cloud and the delay lines of the structure of FIG. 1. That is, the capacitive coupling induces currents in certain paths of the delay lines of the readout structure 30. These currents are detected by detection circuit 15, and have a temporal signature indicative of the parallel paths in which they were induced. Thus, as in prior art delay line detectors, the capacitively-induced charges may be used to determine the position of the electron cloud in the detection plane.

The charge induced on the surface of the readout structure in the embodiment of FIG. 3 is given by the following:

$$\sigma_{SP}(x, y) = -\varepsilon E = \varepsilon dk \int dA \frac{\sigma_{RA}(x', y')}{[(x'-x)^2 + (y'-y)^2 + d^2]^{3/2}} dx' dy'$$

where $\sigma_{RA}$ is the charge density on or near the resistive anode, $\sigma_{sp}$ is the charge induced on the segmented readout plane, d is the separation between the top of the resistive anode and the readout plane, x and y are coordinates in the detection plane, $\epsilon$ is the permittivity between the anode and the readout structure and k is Coulomb's constant. When $\sigma_{RA}$ is a point charge at x=y=0, then the induced charge is given by:

$$\sigma_{SP}(x, y) = \frac{\varepsilon\sigma_A}{[x^2 + y^2 + d^2]^{3/2}}$$

Thus, the width of the induced charge distribution (or, more particularly, the full-width half-maximum) is on the order of the spacing between the top of the resistive anode and the readout plane. In the preferred embodiment, the spacing d is therefore selected so that this width of the charge distribution is matched to a pitch of the delay lines used. This removes the need for finely pitched delay lines.

The resistance of the anode 28 is made high enough that the electric field from the avalanche charge is able to penetrate through to the readout plane 30. Therefore, for a resistive anode 28 of thickness t, the resistivity is made to exceed a predetermined level. In the preferred embodiment, the resistivity ρ (in ohm-cm) is set such that:

$$\rho > 3\,\pi\mu_0 f_{BW} t^2$$

where $f_{BW}$ is the frequency bandwidth of the readout electronics. For example, if the electronics have an effective analog readout bandwidth of 100 MHz, and the resistive anode has a thickness of 1 mm, the resistivity should be made greater than or equal to 0.1 ohm-cm.

Figure 4:
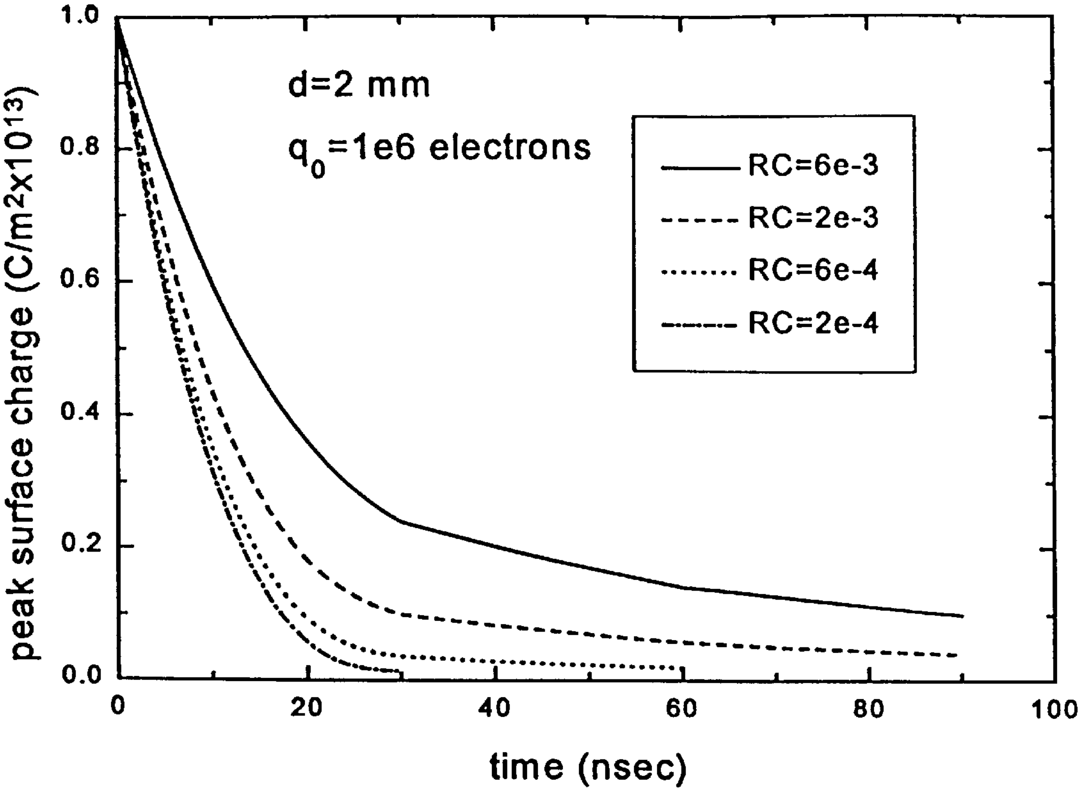
FIG. 4 is a graphical view of the time evolution of a peak charge density for one embodiment of the present invention given different anode material parameters.

The charge that collects on the resistive anode 28 is dissipated by diffusing laterally and is collected at the anode edge. The lateral charge diffusion of the anode layer is given by:

$$\frac{\partial\sigma_{RA}}{\partial t} = \frac{1}{R_S C_S}\Delta\sigma_{RA}$$

where $R_s$ is the surface resistivity of the resistive anode 28 in ohms/sq, and $C_s$ is the capacitance of the anode 28 with respect to the readout plane in F/m$^2$. The fastest possible readout rates are achieved by making $R_sC_s$ as small as possible without violating the resistivity limit given above. FIG. 4 shows the time evolution of the peak charge density for various values of $R_sC_s$. As shown, FIG. 4 indicates that, for a value of $R_sC_s$ on the order of 0.001 ohm-F/m$^2$ or less, Poisson-distributed count rates in excess of $10^7$ counts/mm$^2$-sec are possible.

An example of a resistive anode according to the preferred embodiment uses a borosilicate glass plate. The thickness of the plate is 1–3 mm, depending on the desired anode strip spacing. The plate is coated with indium-tin-oxide on both sides at a resistivity of 100–1000 ohms/sq. Other possible embodiments include thin plates of silicon carbide, doped silicon or other semiconductors.

An additional benefit of the present invention is a reduced occurrence of discharge or arcing. In conventional, segmented-anode parallel grid type detectors, electric flux concentrations occur at the edges of conducting strips. Discharges can occur at these flux concentrations that can potentially damage the readout electronics or, over the long term, degrade the readout anode itself. With the smooth resistive anode of the present invention, such flux concentrations do not exist, and the probability of discharges is thus significantly lower.

While the invention has been shown and described with reference to a preferred embodiment thereof, it will be recognized by those skilled in the art that various changes in form and detail may be made herein without departing from the spirit and scope of the invention as defined by the appended claims. For example, the preferred embodiment is described in terms of x-ray detection, but is equally applicable to detection of high energy particles. Furthermore, as mentioned above, material other than gases may be used as the avalanche medium. Indeed, the detector may be used to detect electron clouds that are generated in any of a number of different ways, for example, by microchannel plate electron multipliers.

What is claimed is:

1. A detection apparatus for detecting an energy signal, the apparatus comprising:

a gas electron avalanche multiplication region in which a primary electron resulting from the energy signal induces an avalanche multiplication to create an electron cloud;

a resistive layer having a detection plane upon which the electron cloud is incident; and a readout apparatus that is capacitively coupled to the resistive layer, and that identifies, within a readout plane substantially parallel to the detection plane, locations of charge induced on the readout apparatus by interaction of the electron cloud with the resistive layer.

2. A detection apparatus according to claim 1 wherein the readout apparatus comprises a parallel grid detector.

3. A detection apparatus according to claim 2 wherein the parallel grid detector comprises a serpentine delay line.

4. A detection apparatus according to claim 1 wherein the readout apparatus has an electrical connection through which the induced charge is dissipated.

5. A detection apparatus according to claim 4 wherein a rate at which the induced charge is dissipated depends on the resistivity of the resistive layer.

6. A detection apparatus according to claim 5 wherein the resistivity ρ of the resistive layer satisfies the relation $\rho > 3\pi\mu f_{BW} t^2$, where $f_{BW}$ is the frequency bandwidth of an accompanying readout circuit connected to the detection apparatus, t is a thickness of the resistive layer and $\mu$ is the magnetic permeability between the resistive layer and the readout apparatus.

7. A detection apparatus according to claim 6 wherein a lateral charge diffusion of the resistive layer is given by the relation:

$$\frac{\partial\sigma_{RA}}{\partial t} = \frac{1}{R_S C_S}\Delta\sigma_{RA}$$

where $R_s$ is a surface resistivity of the resistive layer and $C_s$ is a capacitance of the resistive layer with respect to said plane substantially parallel to the detection plane, and wherein $R_sC_s$ is selected to be relatively small.

8. A detection apparatus according to claim 1 wherein the readout apparatus has adjacent detection lines and wherein a spacing between the detection plane and the readout plane is such that a charge distribution induced at the readout plane from a point charge at the detection plane has a full-width half-maximum diameter that is not substantially less than twice a pitch between the adjacent detection lines.

9. A detection apparatus according to claim 8 wherein the full-width half-maximum diameter of the charge distribution is from three to five times the pitch of the detection lines.

10. A detection apparatus according to claim 1 further comprising an acceleration potential across the avalanche region.

11. A detection apparatus according to claim 1 further comprising a photocathode layer at which the energy signal is converted to said primary electron.

12. A detection apparatus according to claim 11 wherein the photocathode layer is sufficient to convert x-ray energy into electrons.

13. A detection apparatus according to claim 1 further comprising a drift region through which the primary electron travels prior to entering the avalanche region, the drift region having conditions insufficient to induce an avalanche multiplication of the primary electron.

14. An detection apparatus for detecting an energy signal, the apparatus comprising:

a gas electron avalanche multiplication apparatus that receives the energy signal, and in which the energy signal induces an avalanche multiplication to create an electron cloud;

a resistive layer having a detection plane upon which the electron cloud is incident; and a readout apparatus that is capacitively coupled to the resistive layer and that identifies, within a readout plane substantially parallel to the detection plane, locations of charge induced on the readout apparatus by interaction of the electron cloud with the resistive layer, a spacing between the detection plane and the readout plane being such that a charge distribution induced at the readout plane from a point charge at the detection plane has a full-width half-maximum diameter that is not substantially less than twice a pitch between the adjacent detection lines.

15. A detection apparatus according to claim 14 wherein the energy signal comprises x-rays.

16. A detection apparatus for detecting an electron cloud, the apparatus comprising:

a resistive layer having a detection plane upon which the electron cloud is incident, wherein the resistivity ρ of the resistive layer satisfies the relation $\rho>3\pi\mu f_{BW}t^2$, where $f_{BW}$ is the frequency bandwidth of an accompanying readout circuit connected to the detection apparatus, t is a thickness of the resistive layer and $\mu$ is the magnetic permeability between the resistive layer and the readout apparatus; and a readout apparatus that is capacitively coupled to the resistive layer and that identifies, within a plane substantially parallel to the detection plane, locations of charge induced on the readout apparatus by interaction of the electron cloud with the resistive layer.

17. A detection apparatus according to claim 16 wherein the readout apparatus comprises a parallel grid detector.

18. A detection apparatus according to claim 17 wherein the parallel grid detector comprises a serpentine delay line.

19. A detection apparatus according to claim 16 wherein the readout apparatus has an electrical connection through which the induced charge is dissipated.

20. A detection apparatus according to claim 16 further comprising an electron avalanche multiplication apparatus in which a primary electron induces an avalanche multiplication to create the electron cloud.

21. A detection apparatus according to claim 20 wherein the avalanche multiplication apparatus comprises a conversion region within which is located an avalanche medium and across which is an acceleration potential sufficient to induce the avalanche multiplication.

22. A detection apparatus according to claim 21 wherein the avalanche medium comprises a gas.

23. A detection apparatus according to claim 20 further comprising a photocathode layer at which an initial signal energy is converted to said primary electron.

24. A detection apparatus according to claim 23 wherein the photocathode layer is sufficient to convert x-ray energy into electrons.

25. A detection apparatus according to claim 21 further comprising a drift region through which the primary electron travels prior to entering the avalanche medium, the drift region having conditions insufficient to induce an avalanche multiplication of the primary electron.

26. A method of detecting an electron cloud in a gas avalanche multiplication apparatus comprising:

providing a resistive layer having a detection plane upon which the electron cloud is incident; and identifying, with a readout apparatus that is capacitively coupled to the resistive layer, locations of charge induced at a readout plane by the interaction of the electron cloud with the resistive layer.

27. A method according to claim 26 wherein the readout apparatus comprises a parallel grid detector.

28. A method according to claim 27 wherein the parallel grid detector comprises a serpentine delay line.

29. A method according to claim 26 further comprising dissipating the induced charge through an electrical connection to the readout apparatus.

30. A method according to claim 29 further comprising setting a resistivity of the resistive layer to control a rate at which the induced charge is dissipated.

31. A method according to claim 26 further comprising providing the resistive layer with a resistivity ρ that satisfies the relation $\rho>3\pi\mu f_{BW}t^2$, where $f_{BW}$ is a frequency bandwidth of an accompanying readout circuit connected to the detection apparatus, t is a thickness of the resistive layer and $\mu$ is the magnetic permeability between the resistive layer and the readout apparatus.

32. A method according to claim 26 further comprising providing the resistive layer with a lateral charge diffusion that satisfies the relation:

$$\frac{\partial\sigma_{RA}}{\partial t}=\frac{1}{R_S C_S}\Delta\sigma_{RA}$$

where $R_s$ is a surface resistivity of the resistive layer and $C_s$ is a capacitance of the resistive layer with respect to said plane substantially parallel to the detection plane, and wherein $R_sC_s$ is selected to be relatively small.

33. A method according to claim 26 wherein the readout apparatus has adjacent detection lines, and wherein a spacing between the detection plane and the readout plane is such that a charge distribution induced at the readout plane from a point charge at the detection plane has a full-width half-maximum diameter that is not substantially less than twice a pitch between the adjacent detection lines.

34. A method according to claim 33 wherein the charge distribution has a full-width half-maximum diameter that is substantially between three and five times the pitch of the detection lines.

35. A method according to claim 33 wherein the avalanche multiplication apparatus comprises a conversion region within which is located an avalanche medium and across which is an acceleration potential sufficient to induce the avalanche multiplication.

36. A method according to claim 35 wherein the avalanche medium comprises a gas.

37. A method according to claim 35 further comprising generating the electron cloud from a primary electron, wherein the primary electron results from an initial signal energy on a photocathode layer.

38. A method according to claim 37 wherein the photocathode layer is sufficient to convert x-ray energy into electrons.

39. A method according to claim 37 further comprising providing a drift region through which the primary electron travels prior to entering the avalanche medium, the drift region having conditions insufficient to induce an avalanche multiplication of the primary electron.

40. A method of detecting an electron cloud comprising:

providing a resistive layer having a detection plane upon which the electron cloud is incident, the resistive layer having a detection plane upon which the electron cloud is incident, wherein the resistivity ρ of the resistive layer satisfies the relation $\rho>3\ \pi\mu f_{BW}t^2$, where $f_{BW}$ is the frequency bandwidth of an accompanying readout circuit connected to the detection apparatus, t is a thickness of the resistive layer and $\mu$ is the magnetic permeability between the resistive layer and the readout apparatus; and identifying, with a readout apparatus that has adjacent detection lines and is capacitively coupled to the resistive layer, locations of charge induced at a readout plane by the interaction of the electron cloud with the resistive layer.

41. A method according to claim 40 wherein the readout apparatus comprises a parallel grid detector.

42. A method according to claim 41 wherein the parallel grid detector comprises a serpentine delay line.

43. A method according to claim 40 further comprising creating the electron cloud with an electron avalanche multiplication apparatus.

44. A method according to claim 43 wherein the avalanche multiplication apparatus comprises a conversion region within which is located an avalanche medium and across which is an acceleration potential sufficient to induce the avalanche multiplication.

45. A method according to claim 43 wherein the avalanche medium comprises a gas.

46. A method according to claim 43 further comprising converting an initial signal energy to a primary electron with a photocathode layer.

47. A method according to claim 46 wherein the photocathode layer is sufficient to convert x-ray energy into electrons.

48. A method according to claim 46 further comprising providing a drift region through which the primary electron travels prior to entering the avalanche medium, the drift region having conditions insufficient to induce an avalanche multiplication of the primary electron.

49. A method according to claim 40 where in the readout apparatus has adjacent detection lines and a spacing between the detection plane and the readout plane being such that a charge distribution induced at the readout plane from a point charge at the detection plane has a full-width half-maximum diameter that is not substantially less than twice a pitch between the adjacent detection lines.

* * * * *